United States Patent [19]

Itami et al.

[11] Patent Number: 5,296,868
[45] Date of Patent: Mar. 22, 1994

[54] DISPLAY APPARATUS FOR VEHICLE

[75] Inventors: Kazuhiro Itami; Tadashi Iino, both of Shizuoka, Japan

[73] Assignee: Yazaki Corporation, Tokyo, Japan

[21] Appl. No.: 74,565

[22] Filed: Jun. 10, 1993

Related U.S. Application Data

[63] Continuation of Ser. No. 737,000, Jul. 29, 1991, abandoned.

[30] Foreign Application Priority Data

Jul. 30, 1990 [JP] Japan ................. 2-80894[U]
Jul. 31, 1990 [JP] Japan ................. 2-80584[U]

[51] Int. Cl.⁵ ........................................... G02B 27/00
[52] U.S. Cl. ........................... 345/7; 359/630; 359/833; 353/14
[58] Field of Search .................. 340/705, 980; 353/13, 353/14; 359/13, 603, 604, 606, 629, 630, 632, 638, 639, 833, 831, 837, 836

[56] References Cited

U.S. PATENT DOCUMENTS

| | | | |
|---|---|---|---|
| 3,481,668 | 12/1969 | Gundlach | 359/833 |
| 3,722,459 | 3/1973 | Kisselmann et al. | 353/14 |
| 4,322,979 | 4/1982 | Fromm | 359/833 |
| 4,439,010 | 3/1984 | Doty | 359/630 |
| 4,647,967 | 3/1987 | Kirschner et al. | 359/630 |
| 4,714,322 | 12/1987 | Cook | 359/606 |
| 4,886,328 | 12/1989 | Iino | 359/630 |
| 4,969,714 | 11/1990 | Fournier, Jr. et al. | 359/630 |
| 4,986,631 | 1/1991 | Aoki et al. | 359/833 |
| 5,059,956 | 10/1991 | Iino | 340/705 |

FOREIGN PATENT DOCUMENTS

| | | |
|---|---|---|
| 1409743 | 10/1975 | United Kingdom . |
| 2204421A | 11/1988 | United Kingdom . |
| 2204421 | 11/1988 | United Kingdom ........ 340/705 |

*Primary Examiner*—Alvin E. Oberley
*Assistant Examiner*—Kara A. Farnandez
*Attorney, Agent, or Firm*—Armstrong, Westerman, Hattori, McLeland & Naughton

[57] ABSTRACT

A display apparatus for a vehicle by which the brightness of a display image can be varied readily without using a dimming circuit and a display image of a high contrast can be assured. The display apparatus comprises a light emitting displaying element for emitting visible light therefrom, and a reflecting member for reflecting visible light from the light emitting displaying element toward a driver of the vehicle directly or indirectly by way of a component of the vehilce such as a windshield. The reflecting member is selectively moved between a first position at which the reflecting member totally reflects visible light from the light emitting displaying means and a second position at which the reflecting member reflects visible light from the light emitting displaying element but at a comparatively low reflecting rate.

17 Claims, 7 Drawing Sheets

DISPLAY APPARATUS FOR VEHICLE

This application is a continuation of application Ser. No. 07/737,000 filed Jul. 29, 1991, now abandoned.

BACKGROUND OF THE INVENTION

1. Field of the Invention

This invention relates to a display apparatus for a vehicle, and more particularly to a display apparatus for a vehicle wherein a display image of a display device for displaying driving information such as a speed of a vehicle thereon is reflected in a field of view of a windshield toward a driver's seat side thereby to provide such driving information to a driver by way of an indication of a virtual image.

2. Description of the Prior Art

A display apparatus for a vehicle of the type mentioned normally employs, as a display element, a light emitting display device which provides an indication by emission of light such as a fluorescent display tube (VFT), a light emitting diode (LED) or a backlighted liquid crystal display element (LCD).

Figure 13:
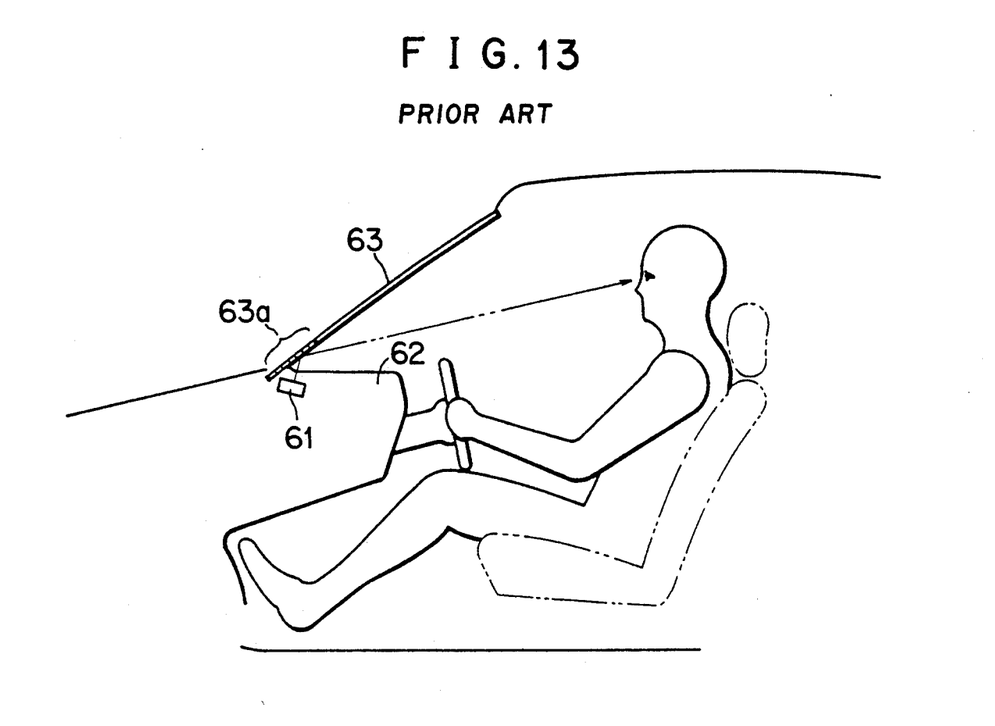
FIG. 13 is a diagrammatic schematic view showing a conventional display apparatus for a vehicle.

An exemplary one of such conventional display apparatus is shown in FIG. 13. Referring to FIG. 13, the conventional display apparatus shown includes a display device 61 for displaying a speed of a vehicle or the like thereon. The display device 61 is disposed on a dashboard 62 adjacent a windshield 63 of a vehicle in which the display apparatus is incorporated. Paint of a dark color such as black is applied to a portion of the windshield 63 adjacent a boundary between the windshield 63 and the dashboard 62 to form a reflecting portion 63a. Thus, a display image of the display device 61 is reflected toward a driver's seat side of the vehicle at the position of the reflecting portion 63a on an inner face of the windshield 63.

Figures 14, 15:
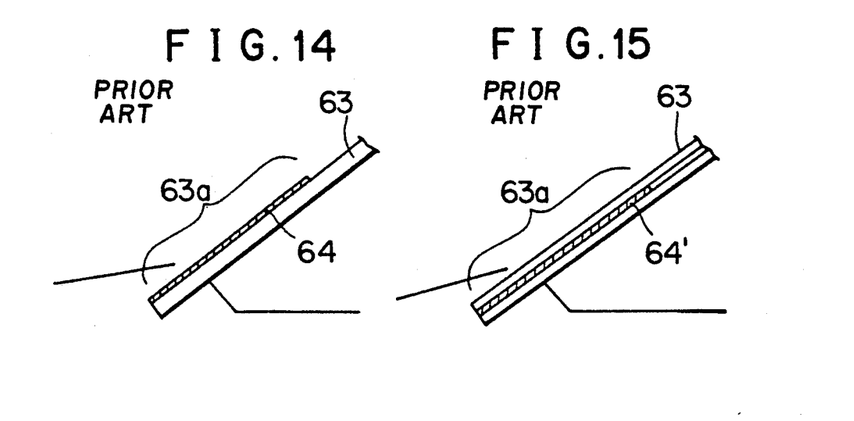
FIGS. 14 and 15 are schematic sectional views showing exemplary different constructions of a reflecting portion of the conventional display apparatus of FIG. 13.

With the display apparatus, a display image of the display device 61 appears in a field of view of the windshield 63 on the background of the dark color of the reflecting portion 63a. Thus, the display apparatus forms a so-called head up display apparatus with which a driver of the vehicle can visually observe the display image without the necessity of moving its eyes very much during driving. Further, since the background of a display image looks dark, there is an advantage that a high contrast is achieved with a display image. It is to be noted that the reflecting portion 63a may be formed, for example, such that a ceramic coating 64 of black or the like is applied to the windshield 63 as shown in FIG. 14 or an opaque film 64' of black or the like is held between two layers of a glass laminate of the windshield 63 as shown in FIG. 15.

With the display apparatus, however, in the daytime when the circumference is bright, the visual observability is low if it is not caused to provide a display image with a high brightness sufficient to be superior to the brightness of the circumference. On the other hand, at night when the circumference is dark, such high brightness for the daytime will make a display image excessively bright and make it difficult to observe the display image.

Accordingly, a conventional display apparatus of the type mentioned often additionally includes a dimming circuit for changing over the brightness of a display image itself of a display device in the daytime and at night. Such additional provision of a dimming circuit, however, makes the display apparatus complicated and requires an increased number of working steps for production and adjustment of such dimming circuit, which results in increase in cost of the entire display apparatus.

The conventional display apparatus has another problem that, since the dark reflecting portion 63a looks on the windshield 63 from the outside of the vehicle, the appearance design of the vehicle is deteriorated thereby. Besides, since the reflecting portion 63a is formed on the windshield 63, the manufacturing procedure thereof is restricted and an operation for the maintenance is elaborate.

SUMMARY OF THE INVENTION

It is an object of the present invention to provide a display apparatus for a vehicle by which the brightness of a display image can be varied readily without using a dimming circuit for dimming a display device itself.

It is another object of the present invention to provide a display apparatus for a vehicle wherein the background of a display image is so dark as to assure a high contrast of the display image but a reflecting portion does not interfere with visual observation of a foreground when no indication is required and besides the appearance design is not damaged by the reflecting portion of a dark color even when watched from the outside of the vehicle.

In order to attain the objects, according to one aspect of the present invention, there is provided a display apparatus for a vehicle, which comprises light emitting displaying means for emitting visible light therefrom, a reflecting member for reflecting visible light from the light emitting displaying means toward a driver of the vehicle directly or indirectly by way of a component of the vehicle such as a windshield, the reflecting member being supported for movement between a first position at which the reflecting member totally reflects visible light from the light emitting displaying means and a second position at which the reflecting member reflects visible light from the light emitting displaying element but at a comparatively low reflecting rate, and means for moving the reflecting member between the first position and the second position.

In the display apparatus, when the reflecting member is at the first position, visible light emitted from the light emitting displaying means is totally reflected by the reflecting member so that it is visually observed in a high brightness by a driver of the vehicle. On the other hand, when the reflecting member is at the second position, visible light is reflected at a low reflecting rate by the reflecting member, and such visible light reflected by the reflecting member is visually observed in a low brightness by the driver.

With the display apparatus, since the brightness of visible light to be visually observed by the driver is changed over by moving the reflecting member between the first position and the second position, a special dimming circuit need not be provided for such changing over of the brightness, and consequently, the brightness of a display image can be varied readily and reduction of the cost can be achieved.

According to another aspect of the present invention, there is provided a display apparatus for a vehicle, which comprises light emitting displaying means for emitting visible light therefrom, a first prism having first and second interfaces defining a prism apex angle therebetween and mounted for movement between first and second positions on a dashboard of the vehicle with the prism apex angle thereof directed upwardly, a dark color processed layer formed on a third interface of the first prism, and means for moving the first prism between the first and second positions, the first prism being disposed such that the incidence angle of a beam of light introduced into the first prism from a visual point of a driver of the vehicle with respect to the second interface is greater, when the first prism is at the first position, than a critical angle of the first prism, but when the first prism is at the second position, such incidence angle is smaller than the critical angle of the first prism.

In the display apparatus, when the first prism is at the first position, the incidence angle of a beam of light introduced into the prism from the visual point of the driver with respect to the second interface of the prism is greater than the critical angle of the prism, a driver of the vehicle will visually observe a display image of the display device reflected from the first interface or the second interface of the first prism in a high contrast on the background provided by the dark color processed layer on the third interface of the first prism. On the other hand, when the first prism is at the second position, the incidence angle of a beam of light introduced into the prism from a visual point of the driver with respect to the second interface of the prism is smaller than the critical angle of the prism. Consequently such beam of light will go out from the prism by way of the second interface of the prism, and accordingly, the driver will visually observe a foreground by way of the first prism.

With the display apparatus, the first interface or the second interface of the prism is used as a reflecting face for reflecting a display image of the display device toward the visual point of the driver. Accordingly, when watched from the outside of the vehicle, the prism does not look conspicuously, and accordingly, the appearance design is not deteriorated.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
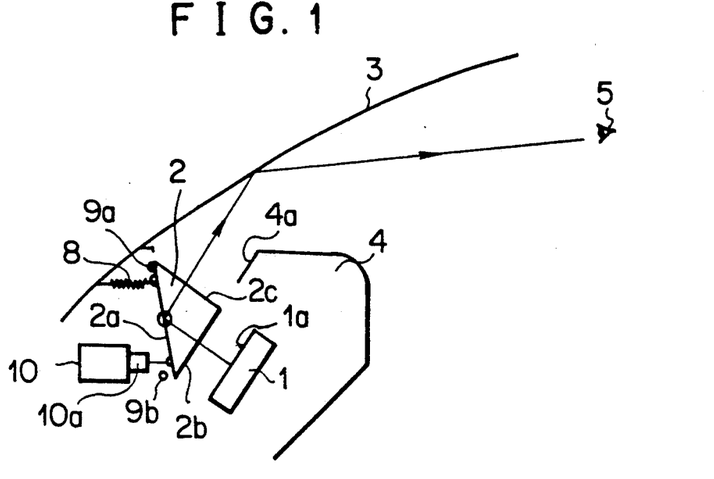
FIG. 1 is a diagrammatic schematic view of a display apparatus for a vehicle showing a preferred embodiment of the present invention.

Referring first to FIG. 1, there is shown a display apparatus for a vehicle to which the present invention is applied. The display apparatus shown includes a display device 1 serving as a light emitting displaying element which provides an indication by emission of light such as a VFT, an LED or a backlighted LCD. The display apparatus further includes a rectangular prism 2 serving as a reflecting member. The rectangular prism 2 is formed by molding of a suitable transparent resin material such as, for example, an acrylic resin into a prism-like profile having an isosceles right triangular section.

Figure 2:
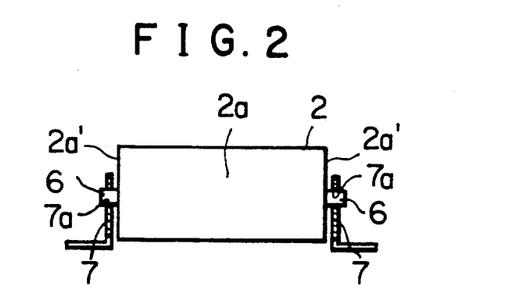
FIG. 2 is a front elevational view of a prism of the display apparatus of FIG. 1.

The display device 1 and the rectangular prism 2 are disposed in a dashboard 4 of a vehicle in which the display apparatus is incorporated. Referring to FIG. 2, the rectangular prism 2 has a pair of support shafts 6 provided in a coaxial relationship on the opposite axial end faces thereof and extending from central portions of the opposite side edges 2a' of a first interface 2a which forms a bottom face of the rectangular prism 2. The support shafts 6 are received in holes 7a of a pair of supporting lugs 7 formed on a fixed portion of the vehicle so that the rectangular prism 2 is supported for turning motion around the common axis of the support shafts 6. Referring back to FIG. 1, the rectangular prism 2 is normally urged to turn in the counterclockwise direction in FIG. 1 by a coil spring 8 which extends between the prism 2 and another fixed portion of the vehicle, and it is normally held in contact with a first stopper 9a fixed on the fixed portion of the vehicle against the urging force of the spring 8 to hold the prism 2 at its first position.

A plunger or movable element 10a of a solenoid 10 is connected to the prism 2 and, when a switch not shown which operates in response to a manually operable light control switch not shown is switched on, for example, at night and consequently the solenoid 10 is energized, the plunger 10a of the solenoid 10 pulls the prism 2 so that the prism 2 is turned in the clockwise direction in FIG. 1 against the urging force of the coil spring 8. Such turning movement of the prism 2 is stopped when the prism 2 is contacted with a second stopper 9b, and as long as the solenoid 10 is energized, the prism 2 is held in its second position at which it is held in contact with the second stopper 9b against the urging force of the solenoid 10.

The display device 1 has a display face 1a and is fixed such that the display face 1a thereof is opposed substantially in a parallel relationship to a second interface 2b which is one of a pair of interfaces 2b and 2c of the rectangular prism 2 which meet perpendicularly with each other. After display light from the display device 1 is introduced into the rectangular prism 2 by way of the interface 2b, it comes to the first interface 2a. Then, when the prism 2 is at the first position, the incidence light to the first interface 2a meets with the first interface 2a at an incidence angle greater than a critical angle of the prism 2. Consequently, the incidence light is totally reflected by the first interface 2a. The thus reflected light then goes out from the prism 2 by way of the third interface 2c. The emergence light from the third interface 2c is introduced to a windshield 3 of the vehicle by way of an opening 4a formed in the dashboard 4 and is reflected by an inner face of the windshield 3 toward a visual point 5 of a driver seated on a driver's seat not shown of the vehicle so that the driver will visually observe a display image of a high brightness formed by the reflected light from the windshield 3.

On the other hand, when the prism 2 is at the second position, incidence light to the first interface 2a of the prism 2 meets with the first interface 2a at another incidence angle smaller than the critical angle. Consequently, most of such incidence light passes through the first interface 2a and goes out from the prism 2 while only a little part thereof is reflected by the first interface 2a. The reflected light from the interface 2a then goes out from the prism 2 by way of the third interface 2c. The emergence light is then reflected by the inner face of the windshield 3 toward the visual point 5 of the driver seated on the driver's seat so that the driver will visually observe a display image of a low brightness.

It is to be noted that the first and second positions of the rectangular prism 2 which are defined by the first and second stoppers 9a and 9b, respectively, are set in the following manner. In particular, when the prism 2 is at the first position, display light from the display device 1 is introduced to the first interface 2a at an incidence angle a little greater than the critical angle so that it is totally reflected toward the visual point 5 by the first interface 2a, but when the prism 2 is at the second position, display light from the display device 1 is introduced to the first interface 2a at another incidence angle a little smaller than the critical angle so that only part thereof is reflected by the first interface 2a while most part thereof is transmitted through the first interface 2a. Due to such setting, the prism 2 must be turned only a little across the position thereof at the critical angle, and the required amount of movement of the plunger 10a of the solenoid 10 is small and consequently a solenoid of a small size can be used as such solenoid 10. Further, even if the prism 2 is turned to vary the direction of reflected light, such a condition does not take place that a display image is displaced by an excessively great extent from the visual point 5 so that it cannot be observed any more.

In the arrangement described above, the coil spring 8 and the solenoid 10 act as moving means for moving the prism 2 between the first and second positions.

It is to be noted that, while the solenoid 10 is employed as a turning driving source for the prism 2 in the arrangement described above, the solenoid 10 may be replaced by a motor which rotates forwardly or reversely in response to switching on or off of the light control switch mentioned hereinabove to rotate the support shafts 6 of the prism 2 in one or the other direction by way of a gearing.

Further, while light reflected by the prism 2 is then reflected toward the visual point 5 by the inner face of the windshield 3 in the display apparatus of the embodiment described above, a separate reflecting member may otherwise be disposed on the inner side of the windshield 3 such that light reflected by the prism 2 is subsequently reflected toward the visual point 5 by such separate reflecting member. Or else, a different prism serving as a reflecting member may be disposed such that it may be projected upwardly above the dashboard 4 through the opening 4a of the dashboard 4 so that light reflected by the prism 20 may be visually observed directly by a driver.

Figure 3:
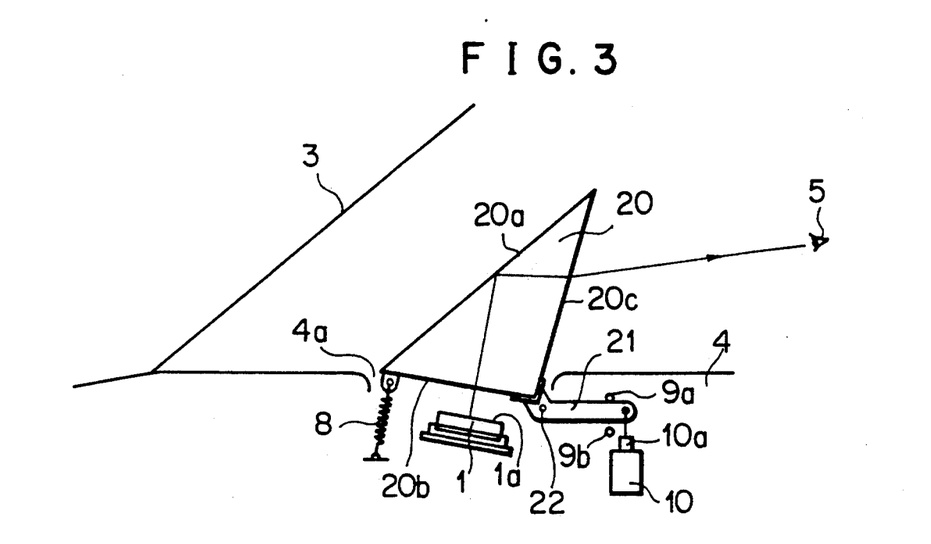
FIG. 3 is a diagrammatic schematic view of another display apparatus for a vehicle showing a second preferred embodiment of the present invention.
Figure 4:
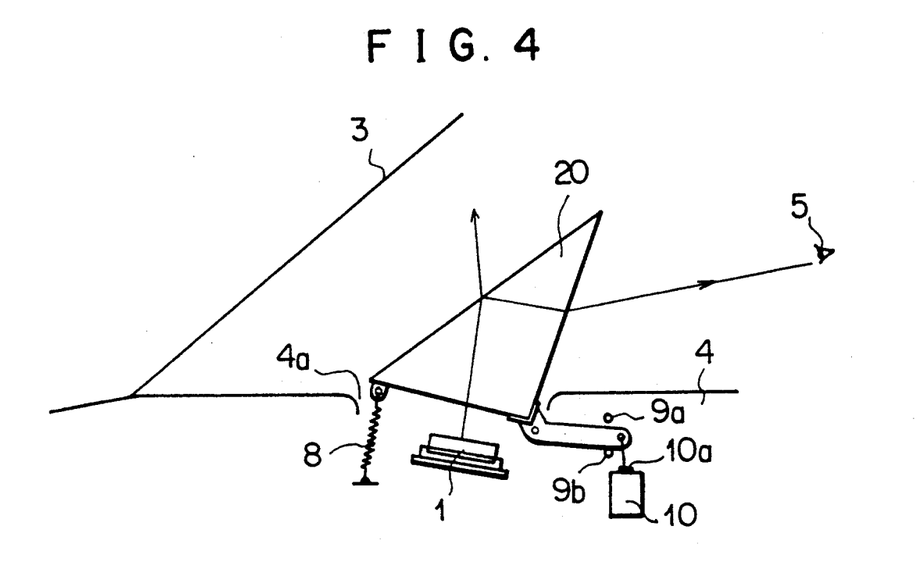
FIG. 4 is a similar view but showing the display apparatus of FIG. 3 in a different position.

The last-mentioned arrangement is shown in FIGS. 3 and 4. Referring to FIGS. 3 and 4, such prism denoted at 20 is supported for turning motion on a support shaft 22 by means of a supporting member 21 secured to the prism 20. Such turning motion of the prism 20 is defined by first and second stoppers 9a and 9b which are provided to contact with the supporting member 21 to define first and second positions of the prism 20. When a solenoid 10 is not energized, the prism 20 assumes the first position at which the supporting member 21 contacts with the first stopper 9a as seen in FIG. 3 under the urging force of a coil spring 8 which acts in the counterclockwise direction in FIG. 3 around an axis of the support shaft 22. In such first position of the prism 20, light from a display device 1 is introduced into the prism 20 by way of a second interface 20b of the prism 20 and is then totally reflected by a first interface 20a of the prism 20, whereafter it goes out from the prism 20 by way of a third interface 20c toward a visual point 5 of a driver. Consequently, a display image of a high brightness of the display device 1 will be visually observed by the driver.

To the contrary, when the solenoid 10 is energized, a plunger 10a thereof pulls the supporting member 21 to turn the prism 20 in the clockwise direction around the support shaft 22 against the urging force of the coil spring 8 to the second position at which the prism 20 contacts with and is stopped by the second stopper 9b as seen in FIG. 4. In the second position of the prism 20, most part of light from the display device 1, which has been introduced into the prism 20 by way of the second interface 20b and come to the first interface 20a, goes out from the prism 20 by way of the first interface 20a while only part thereof is reflected by the first interface 20a and goes out from the prism 20 by way of the third interface 20c toward the visual point 5 of the driver. Consequently, a display image of a low brightness of the display device 1 will be visually observed by the driver.

Also in the display apparatus of the construction shown in FIGS. 3 and 4, the prism 20 is set such that, when it is at the first position, the incidence angle of light from the display device 1 to the first interface 20a is a little greater than a critical angle of the prism 20, but when the prism 20 is at the second position, such incidence angle is a little smaller than the critical angle. Consequently, the brightness of a display image can be changed by turning motion of the prism 20 over a small angle without changing the direction of light toward the visual point 5 of the driver very much.

Figure 5:
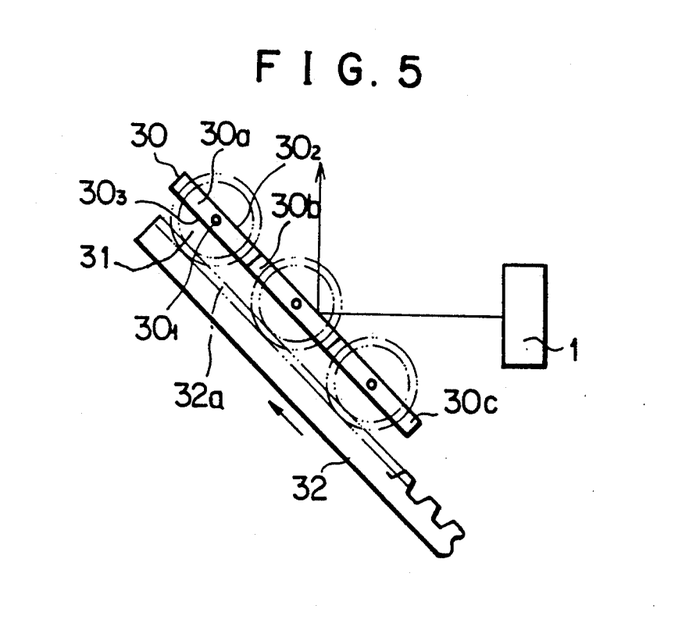
FIG. 5 is a diagrammatic schematic view of a further display apparatus for a vehicle showing a third preferred embodiment of the present invention.

While the position of a display image is a little varied upon changing over of the display brightness in any of the display apparatus of the embodiments described above, the brightness can be changed over without changing the position of a display image by constituting the display apparatus in such a manner as shown in FIG. 5.

In particular, referring to FIG. 5 which shows a third embodiment of the present invention, the display apparatus shown includes a plurality of, three in the arrangement shown, reflecting plates 30a to 30c each serving as a reflecting element. The reflecting plates 30a to 30c and a display device 1 are disposed in a dashboard not shown of a vehicle in which the display apparatus is incorporated. Each of the reflecting plates 30a to 30c has a pair of rotary shafts $30_1$ provided to extend in a coaxial relationship from central portions of the opposite axial end faces thereof and is supported for rotation around the common axis of the rotary shafts 30a thereof. Each of the reflecting plates 30a to 30c is processed such that a face $30_2$ thereof serves as a totally reflecting face and the other face $30_3$ thereof serves as a low reflecting face. A pinion 31 is secured to each of the rotary shafts $30_1$, and all of the pinions 31 of the reflecting 30a to 30c are held in meshing engagement with toothed portions 32a of a pair of racks 32 on the opposite sides of the reflecting plates 30a to 30c. The racks 32 are each connected to a driving element such as a plunger of a solenoid so that it may be moved in a direction indicated by an arrow mark in FIG. 5 or in the opposite direction by the solenoid.

Thus, when the racks 32 are at a first position as seen in FIG. 5, the reflecting plates 30a to 30c assume a first position at which the faces $30_2$ are directed toward a display face of the display device 1 and aligned with each other to form a single totally reflecting face, but when the racks 32 are moved as indicated by the aforementioned arrow mark to a second position, the reflecting plates 30a to 30c are rotated by half rotation by way of the pinions 31 by the racks 32 to a second position at which the other faces $30_3$ thereof are directed toward the display face of the display device 1 to form a single low reflecting face.

With the display apparatus, when the circumference is bright as in the daytime, a totally reflecting face is provided by the reflecting plates 30a to 30c as the the racks 32 are positioned at the first position as seen in FIG. 5. Accordingly, light is totally reflected by such totally reflecting face and then reflected by an inner face of a windshield not shown of the vehicle toward a visual point of a driver, and consequently, the driver can visually observe a display image of a high brightness. On the other hand, when the circumference gets dark and a light control switch not shown is switched on, the racks 32 are moved in the direction indicated by the arrow mark from the first position to the second position. Consequently, the reflecting plates 30a to 30c are rotated by half rotation so that a low reflecting face is provided by the reflecting plates 30a to 30c. Accordingly, light is reflected by the low reflecting face and then reflected toward the visual point of the driver by the inner face of the windshield, and consequently, a display image of a low brightness can be visually observed by the driver.

It is to be noted that, while changing over of the brightness is effected by switching on or off of the light control switch in any of the display apparatus of the embodiments described above, a force of manual operation may otherwise be transmitted mechanically to the prism 2 or 20 or the racks 32 to directly turn the same at an arbitrary point of time.

Figure 6:
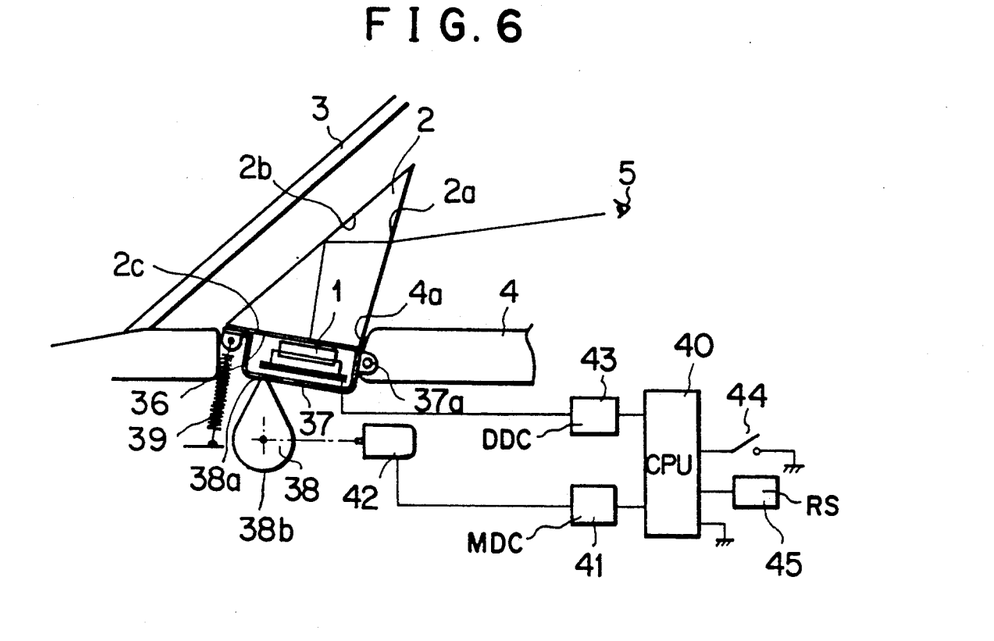
FIG. 6 is a diagrammatic schematic view of a still further display apparatus for a vehicle showing a fourth preferred embodiment of the present invention.
Figure 7:
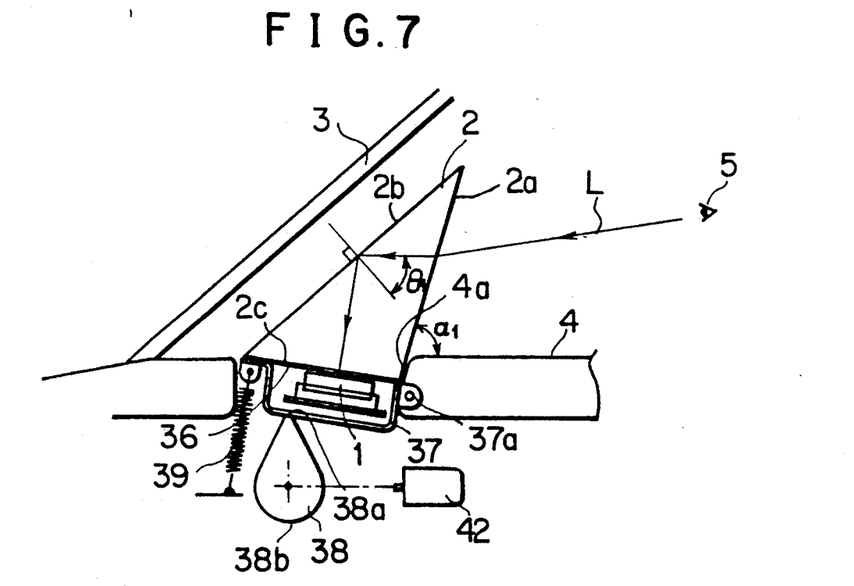
FIG. 7 is a diagrammatic schematic view showing the display apparatus of FIG. 6 in a first position.
Figure 8:
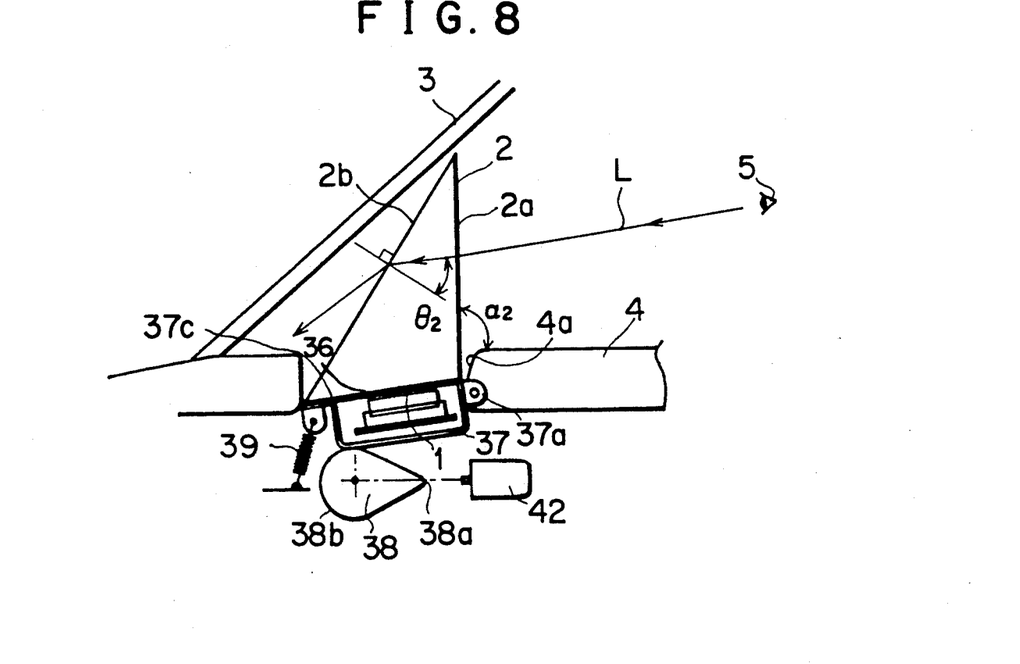
FIG. 8 is a similar view but showing the display apparatus of FIG. 6 in a second position.

Referring now to FIGS. 6 to 8, there is shown a display apparatus of a fourth preferred embodiment of the present invention. The display apparatus includes a display device 1 serving as a light emitting displaying element which provides an indication by emission of light such as a VFT, an LED or a backlighted LCD. The display apparatus further includes a prism 2 serving as a reflecting member. The prism 2 is formed by molding a suitable transparent resin material such as, for example, an acrylic resin into a prism-like profile.

The prism 2 has a first interface 2a directed toward a driver's seat side of a vehicle in which the display apparatus is incorporated and has a second interface 2b opposed to an inner face of the windshield. The prism 2 is disposed on a dashboard 4 below a windshield 3 of the vehicle such that a prism apex angle P thereof at which the first and second interfaces 2a and 2b meet with each other is directed upwardly. The prism 2 has a third interface 2c which serves as a bottom face, and a layer 36 of paint of a dark color is formed on the third interface 2c by application of paint of black or the like. A case 37 is secured to the third interface 2c of the prism 2 behind the paint layer 36. The display device 1 is accommodated in the case 37 such that a display face thereof is held in close contact with a rear face of the paint layer 36. and the paint of the paint layer 36 is partially removed in accordance with a display pattern of the display face of the display device 1. Further, as a method of making the third interface 2c colored with a dark color, there are such processing methods, in addition to such painting as in the embodiment, of closely contacting a material of a dark color with the third interface 2c or of molding a material of a dark color integrally on a prism material.

An opening 4a is formed in an upper face of the dashboard 4, and the entire case 37 and part of a bottom portion of the prism 2 are accommodated in the opening 4a. The case 37 is supported at a pair of tongues 37a formed integrally thereon for pivotal motion at a rear edge portion of the opening 4a so that the prism 2 may be tilted relative to a driver of the vehicle. A cam member 38 is supported for rotation in the inside of the dashboard 4 below the case 37, and a lower face of the case 37 is held in resilient contact with a cam lobe of the cam member 38 under the urging force of a coil spring 39 which extends between the case 37 and a fixed portion of the vehicle. Thus, when an highest point 38a of the cam lobe of the cam member 38 resiliently contacts with the lower face of the case 37, the prism 2 assumes a first position in which the first interface 2a thereof is tilted toward a driver on a driver's seat of the vehicle, but when a lowest point 38b of the cam lobe resiliently contacts with the lower face of the case 37, the prism 2 assumes a second position in which the first interface 2a thereof is tilted in the opposite direction away from the driver.

The cam member 38 is rotated by a motor 42. which is driven by a motor driving circuit 41 which operates under the control of a microcomputer (CPU) 40. so that a portion of the cam lobe at which the cam 38 resiliently contacts with the lower face of the case 37 is changed. Meanwhile, the display device 4 is driven by a display driving circuit (DDC) 43 which also operates under the control of the CPU 40. Various sensors including a change-over switch 44 and a rotation sensor (RS) 45 which generates a pulse signal in response to driving of the vehicle are connected to the CPU 40, and the CPU 40 processes signals from those elements and controls the motor driving circuit (MDC) 41 and the display driving circuit 43 to change the rotational position of the cam member 38 and the contents of indication of the display device 1.

With the display apparatus described above, since the second interface 2b of the prism 2 is employed as a reflecting face for reflecting a display image of the display device 1 toward a visual point 5 of a driver of the vehicle, when watched from the outside of the vehicle, the prism 2 serving as a reflecting member does not look conspicuously, and accordingly, the appearance design is not deteriorated.

Further, when the highest point 38a of the cam lobe of the cam member 38 resiliently contacts with the lower face of the case 37 and the prism 2 assumes the first position wherein it is tilted toward the driver side as seen in FIG. 7 and the first interface 2a thereof is inclined at an angle of $\alpha_1$ with respect to the dashboard 4, a beam of light L from the visual point 5 of the driver is refracted by the first interface 2a and directed toward the second interface 2b of the prism 2. In this instance, the beam of light L is introduced to the second interface 2b at an incidence angle $\theta_1$. Where the configuration and the inclination angle $\alpha_1$ of the prism 2 are set such that the incidence angle $\theta_1$ is greater than a critical angle of 41.8 degrees of an acrylic resin material constituting the prism 2, the second interface 2b acts as a totally reflecting face. Consequently, the beam of light L is totally reflected by the second interface 2b and all directed toward the third interface 2c so that it is absorbed by the dark color paint layer 36 on the third interface 2c. On the other hand, a beam of light from the display device 1 reaches the visual point 5 of the driver by way of a route opposite to that described just above, and consequently, a display image of the display device 2 will be visually observed by the driver in such a condition that it is displayed on the dark background.

To the contrary, when the lowest point 38b of the cam lobe of the cam member 38 resiliently contacts with the lower face of the case 37 so that the prism 2 assumes the second position in which it is tilted in a direction away from the driver as shown in FIG. 8 with the first interface 2a thereof inclined at another angle of $\alpha_2$ with respect to the dashboard 4, a beam of light L from the visual point 5 of the driver is refracted by the first interface 2a and directed toward the second interface 2b of the prism 2. In this instance, the beam of light L is introduced to the second interface 2b at another incidence angle $\theta_2$. Where the shape and the inclination angle $\alpha_2$ of the prism 2 are set such that the incidence angle $\theta_2$ is smaller than the critical angle of 41.8 degrees of an acrylic resin material, the second interface 2b does not act as a totally reflecting face. Consequently, the beam of light L is refracted by the second interface 2b and goes out from the prism 2. Consequently, the prism 2 presents a colorless transparent condition as watched from the driver.

With the display apparatus, when it is necessary for the driver to visually observe a display image of the display device 1, the driver will operate the changeover switch 44. In response to such operation, the CPU 40 outputs a control signal to the motor driving circuit 41 to cause the motor 42 to rotate until the first position of the prism 2 is reached. Consequently, the driver can visually observe a display image of the display device 1 on the dark background. On the other hand, when the driver need not visually observe a display image of the display device 1, the driver may operate the changeover switch 44 reversely. In response to such operation, the CPU 40 outputs another control signal to the motor driving circuit 41 to cause the motor 42 to rotate until the second position of the prism 2 is reached and also causes the display driving circuit 43 to extinguish the current indication of the display device 1. Consequently, the driver will visually observe a foreground by way of the prism 2 in a transparent condition.

With the display apparatus shown in FIGS. 6 to 8, when the prism 2 is at the second position, the prism 2 looks transparent from the driver side, but since a beam of light from the visual point 5 of the driver is refracted when it passes the second interface, the foreground which is visually observed through the prism 2 by the driver is an upper face of the dashboard 4 or an upper face of a bonnet of the vehicle, and accordingly, the driver cannot necessarily see a natural foreground.

Figure 9:
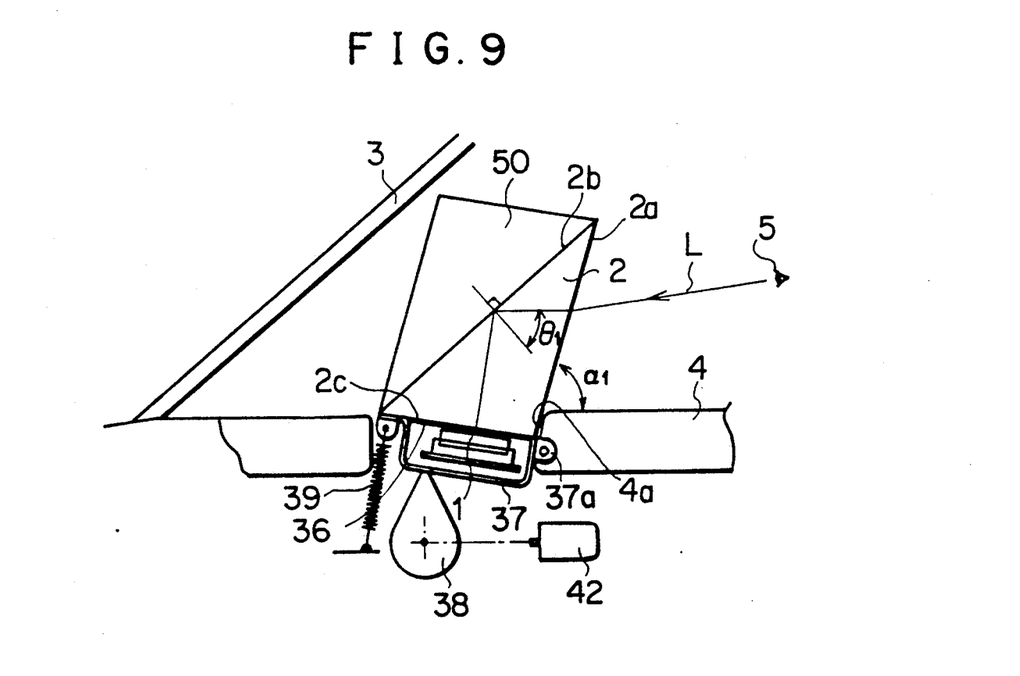
FIG. 9 is a diagrammatic schematic view of a modification to the display apparatus shown in FIG. 6.
Figure 10:
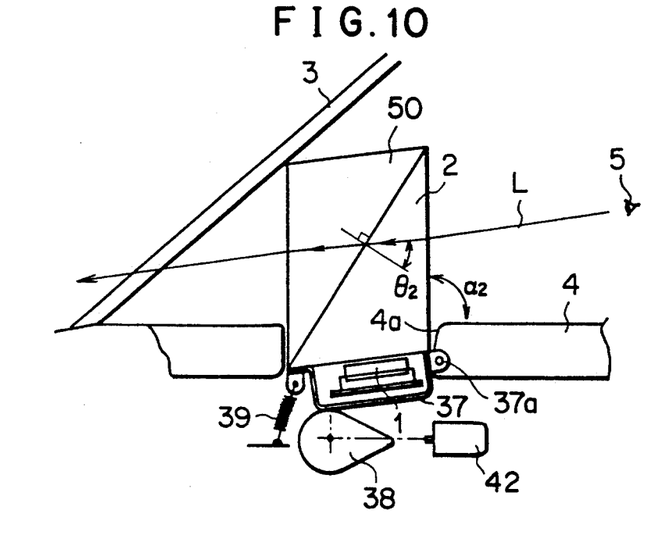
FIG. 10 is a similar view but showing the display apparatus of FIG. 9 in a different position.

A modified display apparatus by which a foreground can be visually observed through the prism 2 when the prism 2 is in the second position is shown in FIGS. 9 and 10. Referring to FIGS. 9 and 10, the modified display apparatus additionally includes a second prism 50 having the same configuration as the prism 2 and applied to the prism 2. In particular, an apex angle of the prism 50 is directed downwardly, and an interface of the prism 50 corresponding to the second interface 2b of the prism 2 is applied in a closely contacted condition to the second interface 2b of the prism 2.

With the modified display apparatus, while the prism 2 operates in a similar manner to that described hereinabove with reference to FIGS. 6 to 8, since the modified apparatus includes the second prism 50, when the prism 2 is in the second position, a beam of light L which has been introduced into the prism 2 from the visual point 5 of the driver and refracted when it goes out from the second interface 2b is refracted again but in the opposite direction when it is introduced into the prism 50. Consequently, the beam of light L going out from the second prism 2 runs in parallel to the direction of the beam of light L which has been introduced into the prism 2 from the visual point 5. Consequently, the driver will see a natural foreground from the visual point 5 through the prisms 2 and 50.

Figure 11:
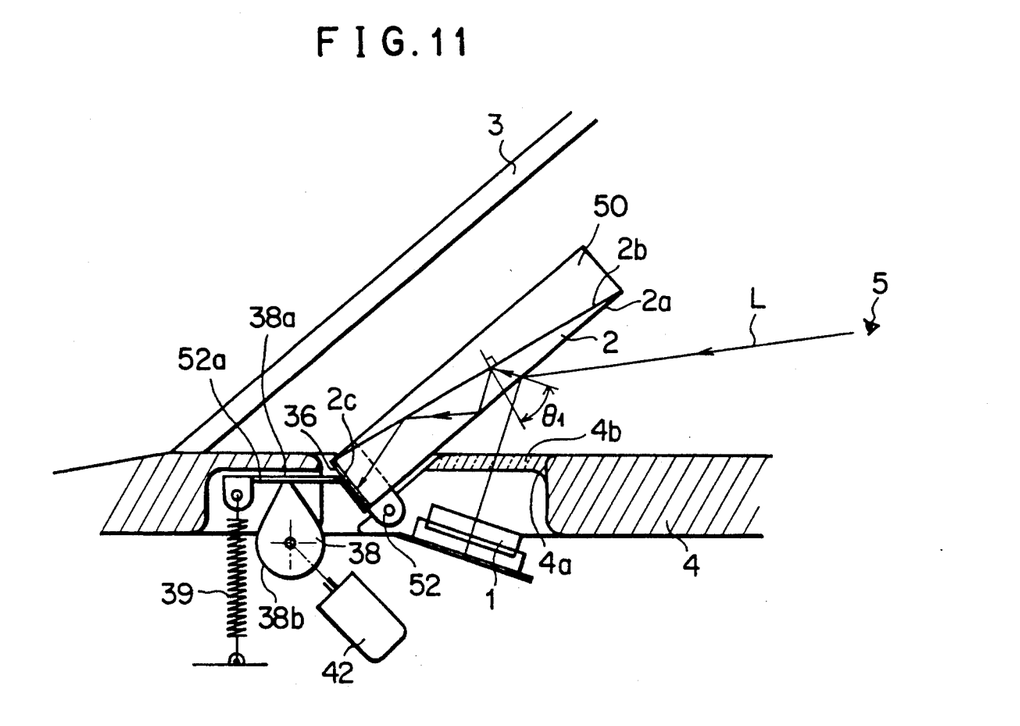
FIG. 11 is a diagrammatic sectional view of a modification to the modified display apparatus shown in FIG. 9.
Figure 12:
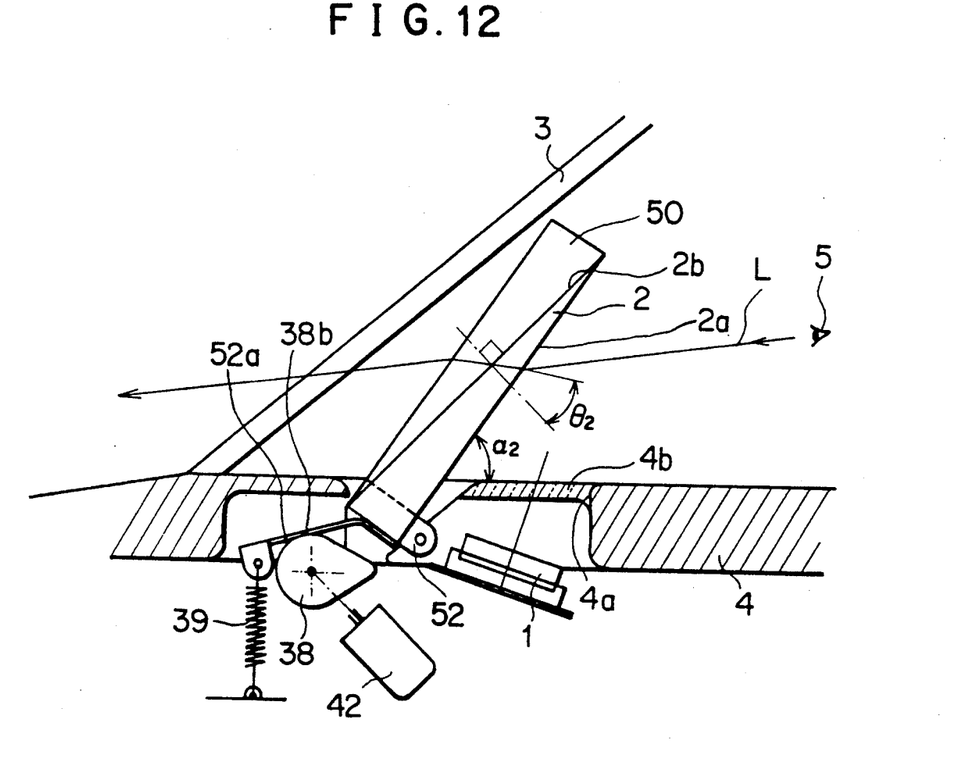
FIG. 12 is a similar view but showing the display apparatus of FIG. 11 in a different position

While the display device 1 in the display apparatus described above with reference to FIGS. 9 and 10 is fixed such that the display face thereof is held in contact with the third interface 2c of the prism 2 and is moved together with the prism 2 by rotation of the cam member 38, the display device 1 may otherwise be installed in a fixed condition within the dashboard 4 with its display surface directed upwardly as shown in FIGS. 11 and 12 such that a beam of light from the display device 1 is introduced to the second interface 2a of the prism 2 by way of a light passing member 4b fitted in the opening 4a of the dashboard 4 so that it may be directed toward the visual point 5 of the driver by the first interface 2a. In the present modified display apparatus, lower end portions of the prisms 2 and 50 are secured to a prism supporting metal member 52 mounted for pivotal motion on the dashboard 4, and the supporting metal member 52 has an extension 52a at which it resiliently contacts with the cam lobe of the cam member 38.

With the modified display apparatus, when the cam member 38 is in the first position wherein the highest point 38a of the cam lobe thereof resiliently contacts with a lower face of the extension 52a of the prism supporting metal member 52 as seen in FIG. 11, a beam of light L from the visual point 5 of a driver is refracted by the first interface 2a and directed toward the second interface 2b of the prism 2. In this instance, the beam of light L is introduced to the second interface 2b at an incidence angle $\theta_1$. Since the incidence angle $\theta_1$ is set greater than a critical angle of the prism 2, the second interface 2b acts as a totally reflecting face, and consequently, the beam of light L reflected by the second interface 2b is all directed toward the third interface 2c and thus absorbed by the dark paint layer 6 on the third interface 2c. Consequently, a display image of the display device 1 is visually observed by the driver in such a condition that it is displayed on the dark background. Accordingly, a display image of a high contrast ratio is obtained.

To the contrary, when the cam member 38 is in the second position shown in FIG. 12 wherein the lowest point 38b of the cam lobe thereof resiliently contacts with the lower face of the case 7, a beam of light L from the visual point 5 of the driver is refracted by the first interface 2a and directed toward the second interface 2b of the prism 2 so that it is introduced to the second interface 2b at an incidence angle of $\theta_2$. Where the incidence angle $\theta_2$ is set smaller than the critical angle of the prism 2, the second interface 2b does not act as totally reflecting face, and consequently, the beam of light L is refracted by the second interface 2b and goes out from the prism 2. The beam of light L going out from the prism 2 is introduced into the prism 50, whereupon it is refracted again but in the reverse direction. Consequently, the beam of light L advances along a straight line in the prisms 2 and 50. Then, when the beam of light L goes out from the second prism 2, it is refracted again so that it thereafter advances in parallel to the direction of the beam of light L which has been introduced into the prism 2 from the visual point 5. Consequently, the driver can see a foreground from the visual point 5 through the prisms 2 and 50. In other words, the driver can see, through the two prisms 2 and 50, a foreground forwardly of the vehicle in such a condition as there is no prism there.

It is to be noted that, while the case is illustrated wherein the two prisms 2 and 50 employed in the display apparatus shown in FIGS. 9 to 12 have a mutually same configuration, the two prisms need not necessarily have a mutually same configuration.

Having now fully described the invention, it will be apparent to one of ordinary skill in the art that many changes and modifications can be made thereto without departing from the spirit and scope of the invention as set forth herein.

What is claimed is:

1. A display apparatus for a vehicle, comprising:
   light emitting displaying means for emitting visible light therefrom;
   a reflecting member for reflecting visible light from said light emitting displaying means toward a driver of said vehicle directly or indirectly by way of a component of said vehicle such as a windshield, said reflecting member being supported for movement between a first position at which said reflecting member totally internally reflects visible light directly from said light emitting displaying means and a second position at which said reflecting member internally reflects part of said visible light from said light emitting displaying means and transmits a remaining part of said visible light therethrough; and
   means for moving said reflecting member between the first position and the second position.

2. A display apparatus for a vehicle as claimed in claim 1, wherein said reflecting member is mounted for turning movement between said first and second positions around a fixed axis with respect to said vehicle.

3. A display apparatus for a vehicle as claimed in claim 1, wherein said moving means includes a spring for normally urging said reflecting member toward the first position and externally controllable operating means for moving said reflecting member from the first position to the second position against the urging force of said spring.

4. A display apparatus for a vehicle, comprising:
   light emitting display means for emitting visible light therefrom;
   a first prism having first and second interfaces defining a prism apex angle therebetween and mounted on a dashboard of said vehicle for movement between first and second positions with said prism apex angle thereof directed upwardly;
   a dark color processed layer formed on a third interface of said first prism; and
   means for moving said first prism between said first and second positions;
   said first prism being disposed such that an incidence angle of a beam of light introduced into said first prism from said light emitting means and directed to a visual point of a driver of said vehicle with respect to said second interface is greater, when said first prism is at the first position, than a critical angle of said first prism wherein light is totally internally reflected, and when said first prism is at the second position, said incidence angle of said beam of light is smaller than the critical angle of said first prism wherein part of said light is internally reflected and a remaining part of said light is transmitted therethrough.

5. A display apparatus for a vehicle as claimed in claim 4, further comprising a second prism having a substantially same profile as said first prism and adhered to said first prism with the respective second faces thereof held in contact with each other with the prism apex angle thereof directed downwardly such that light from the position of the visual point may pass through said first and second prisms.

6. A display apparatus for a vehicle, comprising:
   light emitting displaying means for emitting visible light therefrom;
   a reflecting member for reflecting visible light from said light emitting displaying means toward a driver of said vehicle directly or indirectly by way of a component of said vehicle such as a windshield, said reflecting member comprising a plurality of reflecting plates with each reflecting plate having a first face having a comparatively high reflecting rate and a second face having a comparatively low reflecting rate and mounted in a plane for rotation around respective axes fixed with respect to said vehicle, and
   means for rotating said reflecting plates around the respective axes between first and second positions at which said first faces and said second faces of said reflecting plates are opposed to said light emitting displaying means to provide a single reflecting face which reflects visible light from said light emitting displaying means at a comparatively high reflecting rate and a comparatively low reflecting rate, respectively.

7. A display apparatus for a vehicle, comprising:
   light emitting displaying means for emitting visible light therefrom;
   a reflecting member for reflecting visible light from said light emitting displaying means toward a driver of said vehicle directly or indirectly by way of a component of said vehicle such as a windshield, said reflecting member being mounted for turning movement around an axis fixed with respect to said vehicle between a first position at which said reflecting member totally internally reflects visible light directly from said light emitting displaying means and a second position at which said reflecting member internally reflects part of said visible light from said light emitting displaying means and transmits a remaining part of said visible light therethrough; and means for moving said reflecting member between the first position and the second position.

8. A display apparatus for a vehicle as claimed in claim 7, wherein said reflecting member is a prism having a triangular section and disposed such that visible light from said light emitting displaying means is introduced into said prism by way of a first interface and then reflected by a second interface and then goes out from said prism by way of a third interface.

9. A display apparatus for a vehicle as claimed in claim 8, wherein said prism is a rectangular prism having a section of an isosceles right triangle, the axis of said rectangular prism extending along the center of said second interface of said rectangular prism which is an interface of said rectangular prism corresponding to the oblique side of the isosceles right triangle.

10. A display apparatus for a vehicle as claimed in claim 8, wherein said reflecting member is a prism having a triangular section and disposed such that visible light from said light emitting displaying means is introduced into said prism by way of a first interface and then reflected by a second interface and then goes out from said prism by way of a third interface and, when said reflecting member is at the first position, the incidence angle of visible light to said second interface of said prism is a little greater than a critical angle of said prism, but when said reflecting member is at the second position, such incidence angle is a little smaller than the critical angle.

11. A display apparatus for a vehicle, comprising:
light emitting displaying means for emitting visible light therefrom;
a prism for reflecting visible light from said light emitting displaying means toward a driver of said vehicle directly or indirectly by way of a component of said vehicle such as a windshield, said prism having a triangular section and being supported by a supporting means for turning movement around an axis fixed with respect to said vehicle and outside said prism between a first position at which said prism totally internally reflects visible light directly from said light emitting displaying means and a second position at which said prism internally reflects part of said visible light from said light emitting displaying means and transmits a remaining part of said visible light therethrough, said visible light from said light emitting displaying means being introduced into said prism by way of a first interface and reflected by a second interface to exit said prism by a third interface;
means including a spring for urging said prism toward said first position; and
means for moving said prism between the first position and the second position.

12. A display apparatus for a vehicle as claimed in claim 11, wherein said supporting means includes a supporting member on said dashboard for supporting said first prism for pivotal turning motion between said first and second positions and having said prism secured thereto.

13. A display apparatus for a vehicle as claimed in claim 9, wherein said prism is secured to said supporting member with said first interface thereof opposed to said supporting member, and said light emitting displaying means is mounted on said supporting member in an opposing relationship to said first interface of said prism.

14. A display apparatus for a vehicle as claimed in claim 13, further comprising a light absorbing layer of a dark color formed on said first interface of said prism.

15. A display apparatus for a vehicle, comprising:
light emitting display means for emitting visible light therefrom;
a prism having first and second interfaces defining a prism apex angle therebetween;
a supporting member on a dashboard of said vehicle and supporting said prism for pivotal turning movement between first and second positions with said prism apex angle thereof directed upwardly, said light emitting display means being mounted on said supporting member such that visible light therefrom is introduced into said prism by a third interface;
a dark color processed layer formed on said third interface of said prism to surround said light emitting display means; and
means for moving said prism between said first and second positions;
said prism being disposed such that an incidence angle of a beam of light introduced into said prism from said light emitting means and directed to a visual point of a driver of said vehicle with respect to said second interface is greater, when said prism is at the first position, than a critical angle of said prism wherein light is totally internally reflected, and when said prism is at the second position, said incidence angle of said beam of light is smaller than the critical angle of said prism wherein part of said light is internally reflected and a remaining part of said light is transmitted therethrough.

16. A display apparatus for a vehicle, comprising:
light emitting display means for emitting visible light therefrom, said light emitting display means being securely mounted to a dashboard of said vehicle or another fixed portion of said vehicle;
a prism having first and second interfaces defining a prism apex angle therebetween;
a supporting member on said dashboard of said vehicle and supporting said prism for pivotal turning movement between first and second positions with said prism apex angle thereof directed upwardly;
a dark color processed layer formed on a third interface of said prism; and
means for moving said prism between said first and second positions;
said prism being disposed such that an incidence angle of a beam of light introduced into said prism from said light emitting means and directed to a visual point of a driver of said vehicle with respect to said second interface is greater, when said prism is at the first position, than a critical angle of said prism wherein light is totally internally reflected, and when said prism is at the second position, said incidence angle of said beam of light is smaller than the critical angle of said first prism wherein part of said light is internally reflected and a remaining part of said light is transmitted therethrough.

17. A display apparatus for a vehicle as claimed in claim 16, wherein said light emitting display means and said first prism are disposed in a hole formed in said dashboard such that, when said prism is at said first position, light from said light emitting display means is transmitted through a transparent member fitted in said hole and then reflected by said interface of said prism toward the visual point.

* * * * *